US005389913A

United States Patent [19]

Boser et al.

[11] Patent Number: 5,389,913

[45] Date of Patent: Feb. 14, 1995

[54] WARNING SYSTEM FOR VEHICLES

[75] Inventors: Ronald Boser, 1025 Commerce Ave., Vero Beach, Fla. 32960; Vito Farinola; Bert Greenberg, both of 5805-A W. Park Rd., Hollywood, Fla. 33021; David Schrenk, Vero Beach, Fla.

[73] Assignees: Ronald Boser, Vero Beach; Vito Farinola; Bert Greenberg, both of Hollywood, all of Fla.

[21] Appl. No.: 243,747

[22] Filed: May 17, 1994

Related U.S. Application Data

[63] Continuation of Ser. No. 12,502, Feb. 2, 1993, abandoned.

[51] Int. Cl.$^{6}$ ............ B60Q 1/26

[52] U.S. Cl. ............ 340/471; 340/474; 340/468

[58] Field of Search ............ 340/463, 471, 474, 468, 340/326, 330, 815.31, 815.32

[56] References Cited

U.S. PATENT DOCUMENTS 3,436,728 4/1969 Silverwood ............ 340/474
3,553,644 1/1971 Elmer ............ 340/471
3,786,498 1/1974 Lipe ............ 340/474
3,821,701 6/1974 Ross ............ 340/464
3,891,986 6/1975 Lipe ............ 340/474
4,213,115 7/1980 Wetzel ............ 340/815.22 X
4,262,277 4/1981 Abonia ............ 340/471
4,692,736 9/1987 Crisci ............ 340/471 X

*Primary Examiner*—Hezron E. Williams
*Assistant Examiner*—Christine K. Oda
*Attorney, Agent, or Firm*—McAulay Fisher Nissen Goldberg & Kiel

[57] ABSTRACT

An enhanced motor vehicle warning system provides flashing lights in response to the sounding of the horn. The driver can either enable or disable the system. When the system is enabled and the horn is sounded, latching and time delay relays close to provide power to various lamps and in particular to the high beam lamps and back-up lamps. This power, through the latching relay, is provided through a flasher so that these lamps provide a visible flashing light signal in synchronism with the flasher for the predetermined time period set by the time delay relay. Parking lamps may also be energized, if they are off. But preferably not through the flasher.

8 Claims, 2 Drawing Sheets

WARNING SYSTEM FOR VEHICLES

This is a continuation of application Ser. No. 08/012,502 filed Feb. 2, 1993, now abandoned.

BACKGROUND OF THE INVENTION

This invention relates in general to an enhanced warning system for vehicles and more particularly to one in which a visual warning is added to the auditory warning provided by the horn of a motor vehicle.

In general, when a driver of a motor vehicle hits the horn, it is to attract attention to a matter of considerable importance and usually a matter affecting human safety. A horn is a very useful device for catching attention.

However, there are a number of situations where the horn of a vehicle may not be heard because the modern vehicle more completely isolates and insulates the driver then used to be the case. Vehicles today include climate control systems that encourage one to keep the windows closed. Some vehicles provide a degree of sound proofing in order to enhance the comfort of the driver and riders. The chance that a driver may not hear the sound of a horn is greater than it used to be. Accordingly, a major purpose of this invention is to enhance the warning provided to others on the road when a driver sounds the horn.

In order to increase the availability of this enhancement, it is an important purpose of this invention to provide the enhancement with a minimum of reconfiguration of the arrangements presently available in a motor vehicle.

It is an important purpose of this invention to provide an enhancement of the warning provided by the audible sound of a horn in a context that minimizes additional cost and additional complexity of design.

BRIEF DESCRIPTION

In brief, an embodiment of this invention employs a latching and delay relay arrangement which responds to the sounding of the horn of a vehicle. When the horn is sounded, the latching and delay relays are thrown into an on state which provides a source of power to one or more predetermined lamp circuits for the period of time determined by the delay relay. A flasher in series between the power providing latching relay and a relay to the high beam circuit of the head lamps causes the high beam circuit to flash on and off in synchronism with the flasher. The flasher is also in series between the power switch of the latching relay and the back-up lamps to cause the back-up lamps to oscillate on and off in synchronism with the flasher. In both cases, if the head lamps or back-up lamps are already on, the associated relay switches those lamps from their ordinary source of power to the source of power that is provided through the flasher so that they will be in a flashing state. If the lamps are off, they are simply switched to this flashing on and off state. The parking lamps are also connected through a relay to the power switch of the latching relay. But they are not connected through the flasher so that they are simply turned on if they are off at the time the horn is sounded and there is no change in their state if they are on at the time the horn is sounded. An enable/disable switch permits the operator to disable the system when desired.

DESCRIPTION OF THE PREFERRED EMBODIMENTS

Figure 1:
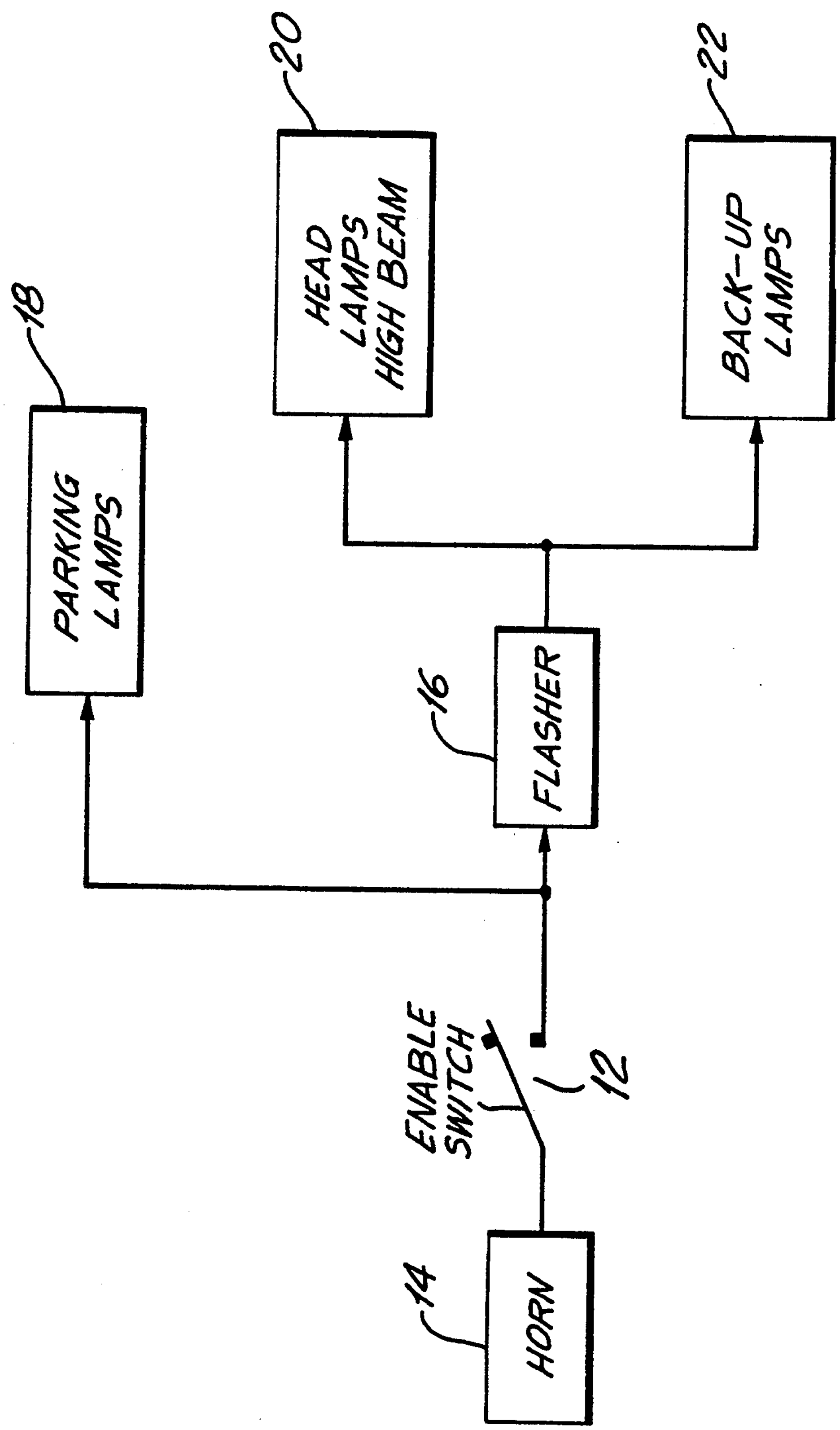
FIG. 1 is a block diagram illustrating the functional arrangement of the system of this invention.
Figure 2:
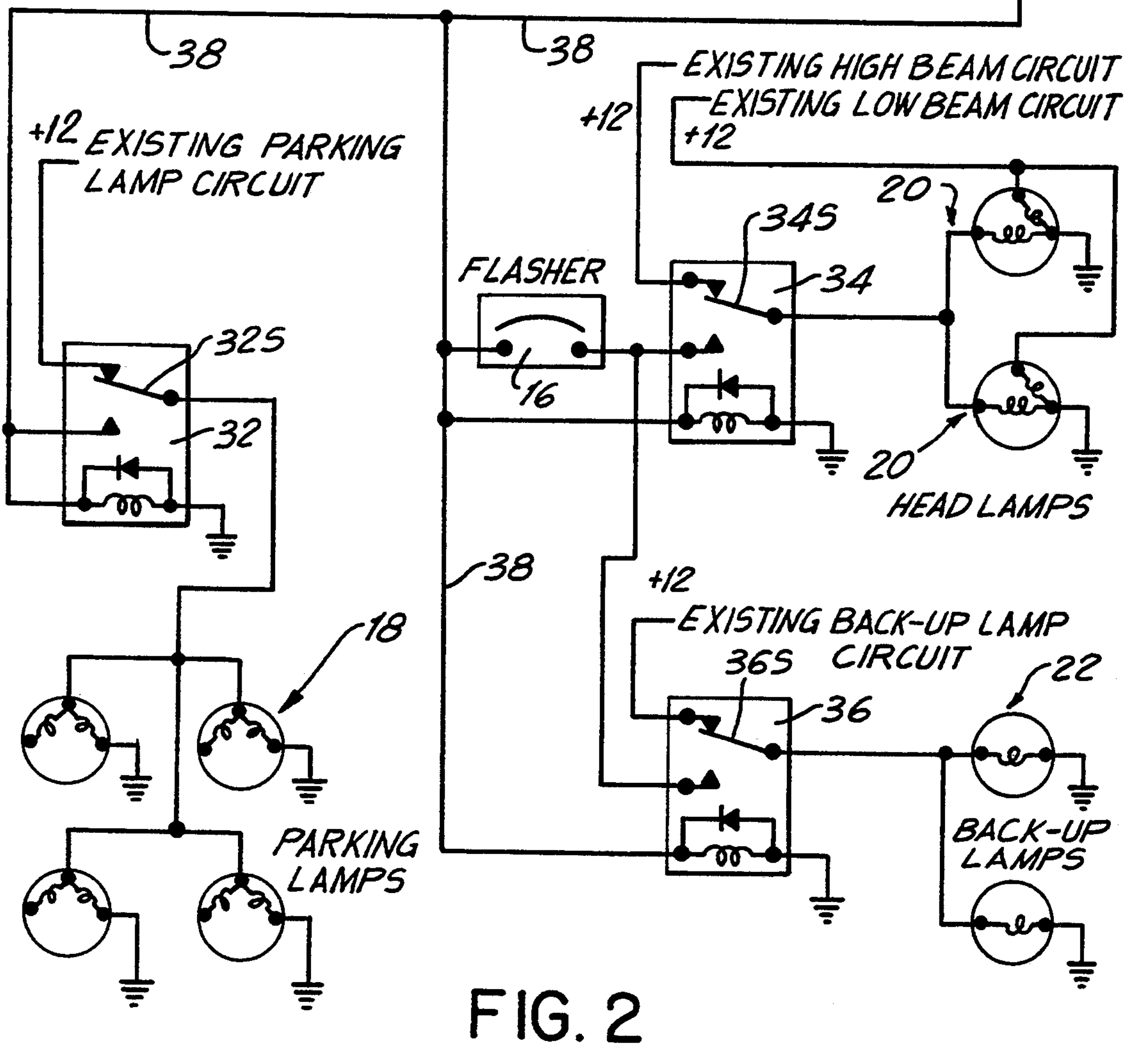
FIG. 2 is a more specific schematic diagram illustrating the arrangement of the system of this invention.

FIG. 1 indicates the major components of the system in a simplified form which leaves out certain significant features disclosed in greater detail in the schematic diagram of FIG. 2.

An enable switch 12 permits the driver of the car to either enable or disable the system of this invention. That is, the system of this invention will only operate when the enable switch 12 is closed so that the output from the horn 14 is connected up to the flasher 16 and other elements of the system of this invention. FIG. 1 shows the switch 12 in the disable position. When the switch 12 is closed and in the enable position, sounding the horn 12 will close a switch (shown in FIG. 2) which applies energizing power, normally from a 12 volt battery, to the parking lamps 18 and through the flasher 16 to the high beams of the head lamps 20 and to the back-up lamps 22.

If the parking lamps 18 are on, this operation will have no visible effect because they will simply remain on. It is only if the parking lamps are off that they will be turned on by the system.

However, by means of relay shown in greater detail in FIG. 2, the high beams of the head lamps 20 and the back-up lamps 22 will both be turned on through the flasher 16. That will occur whether the lamps 20 and 22 are in an off state or in an on state when the horn 14 is sounded. This means that the back-up lamps if on will start to flash on and off and any off state will start to flash on and off. Similarly, the high beam of the head lamp if on will flash on and off and if off, will flash on and off.

With this basic concept in mind, FIG. 2 can be more readily understood and will provide a more detailed description of how the system of this invention can be made to operate.

The enable/disable switch 12 is shown in the open state. It has to be placed into a closed state for the system to be made operative. When the switch 12 is in the closed state and the horn 14 is sounded, the horn switch 24 closes applying power to the coil of the horn relay 26 thereby closing the switch 26S. The closed switch 26S applies power through the diode 28 and the closed enable switch 12 to the coil of the latching relay 30. The lower arm of the switch arms 30S provides a latching function and the upper arm of the switch 30S provides power to the parking lamp relay 32 and high beam head lamp relay 34 and back-up lamp relay 36.

This power is applied to the relays 32, 34 and 36 only if the off delay relay 37 is energized. The coil of the off delay relay 37 is energized by the closing of the horn relay switch 26S which closes the switch 37S and thereby provides a ground return for the coil of the latching relay 30. This off delay relay 37 is set for a predetermined time during which it stays in its on state after being energized. This predetermined time might be for five seconds. Accordingly, when the horn is sounded and the switch 26S closes, the relay 37 is actuated, the switch 37S closes and the latching relay 30 is activated to provide power on the line 38 to the relays 32, 34 and 36. But this power is provided for only a predetermined time period, for example, five seconds. After five seconds, the off delay relay 37 automatically opens deenergizing the coil of the latching relay 30 and causing latching relay 30 to switch back to its off state removing power from the line 38 to the relays 32, 34 and 36.

Power applied to the parking lamp relay 32 switches the relay from the state shown to a state wherein the switch 32S switches from the state shown where it connects power from the line 36 to the parking lamps 18. If the parking lamps are already on because of power connected from the existing parking lamp circuit through the switch 32S, they will simply remain on by virtue of the switch 32S and no difference will be noted. Thus, in the embodiment of the invention shown, the only effect of the implementation of this invention on the parking lamps will be to turn them on if they are off.

More importantly, power from the line 38 is applied to the relay 36 which switches the state of the switch on 36S from that shown to one which applies power to the back-up lamps 22 through the flasher 16. If the back-up lamps are off, they are turned on through the flasher 16 so that the back-up lamps will oscillate at the rate determined by the flasher 16 between a off or low light state to a full or a high light state. Similarly, power from the line 36 is applied to the relay 34 thereby switching the state of the relay switch on 34S from that shown to one where power from the line 36 is applied through the flasher 16 to the high beam circuit of the head lamps 20. This energization of the relay 34 switches the power applied to the high beam circuit from that provided by the existing high beam circuit to that provided by the line 36. But since it is through the flasher 16, the high beams of the head lamps 20 will oscillate at a rate determined by the flasher 16 between an off or low intensity level to a full or high intensity level. It should be noted that low beams of the head lamps 20 are not affected and the existing low beam circuit remains directly connected to the low beams.

When the system is enabled and the horn is actuated, the high beams of the head lamps 20 will switch either from their off state into the flashing state provided by this invention or from their fully on state to the flashing state provided by this invention.

The embodiment described involves providing actual potential visual indications of a warning situation through use of the parking lamps, high beam head lamps and back-up lamps. The system could readily be extended or modified to include the flashing and/or turning on of low beam lights, side lights, hazard lights, brake lights or fog lights. However, those lights are not incorporated in the preferred embodiment indicated above because applicants consider that use of such might produce confusion and/or an inappropriate response. For example, braking lights are used to indicate a braking function which, if it does not occur, might provide a miscue that would create a problem or inappropriate reaction on the part of adjacent drivers. Similarly, turn signals are used for a turning function and actuation of them might cause an inappropriate reaction by adjacent drivers.

It would be preferable not to interrupt a vehicle lighting that is required for safe night operation such as the low beam head lamps as well as the turn signals and tail and brake lights.

In general terms, the system of this invention could be adapted to incorporate any one of these other light functions.

The flasher 16 can be changed to vary the flashing rate. Optimum flashing rate would depend upon appreciable experience. For example, a flashing rate of once per second might be too low because a car can move at a decent amount of distance in a second. Perhaps the flashing rate of half a second or a quarter of a second might turn out to be an appropriate flashing rate that would provide appropriate flashing without appearing to be just a flicker. A distinct predetermined rapid rate of flashing that becomes to be recognized as associated with the response to a horn signal would assist in driver recognition of this warning signal existing.

What is claimed is:

1. In a motor vehicle having a horn, a horn circuit; back-up lamps and a back-up lamp circuit; high beam head lamps and a high beam head lamp circuit; and park lamps and a park lamp circuit, each of the lamp circuits having a normal off-state and an on-state, a horn warning system comprising:

a first relay having a normal off-state and an on-state, said first relay responsive to actuation of the horn circuit to switch from said normal off-state to said on-state, when the horn is sounded, a flasher circuit switching on and off in response to the on-state of said first relay, a second relay, said flasher circuit, said second relay and the back-up lamps connected in series to said on-state of said first relay, said second relay when actuated by said on-state of said first relay switching said back-up lamps from the back-up lamp circuit to said flasher circuit, actuation of said horn circuit causing said back-up lamps to switch on and off in synchronism with the switching of said flasher circuit, a third relay, said flasher circuit, said third relay and the high beams of said head lamps connected in series to said on-state of said first relay, actuation of said third relay by the on-state of said first relay causing the high beams of said head lamps to be switched from the high beam circuit to said flasher circuit, actuation of said horn circuit causing said high beam head lamps to switch on and off in synchronism with the switching of said flasher circuit, said back-up lamps and said high beams of said head lamps being the only lights connected to said flasher circuit, a fourth relay, the parking lamps and said fourth relay being connected in series to said on-state of said first relay, actuation of said horn circuit causing the parking lamps, when off, to be turned on.

2. The motor vehicle warning system of claim 1 further comprising:

a timer responsive to the on-state of said first relay to switch said first relay into said off-state at a predetermined time period after the horn circuit is actuated.

3. The warning system of claim 1 further comprising:

a manual enable/disable switch between said first relay and the horn circuit to permit operator disconnection of said warning system.

4. The warning system of claim 2 further comprising:

a manual enable/disable switch between said first relay and the horn circuit to permit operator disconnection of said warning system.

5. In a motor vehicle having a horn, a horn circuit; back-up lamps and a back-up lamp circuit; high beam head lamps and a high beam head lamp circuit; and park lamps and a park lamp circuit, each of the lamp circuits having a normal off-state and an on-state, a horn warning system comprising:

a first relay having a normal off-state and an on-state, said first relay responsive to actuation of the horn circuit to switch from said normal off-state to said on-state, when the horn is sounded, a flasher circuit switching on and off in response to the on-state of said first relay, a second relay, said flasher circuit, said second relay and the back-up lamps connected in series to said on-state of said first relay, said second relay when actuated by said on-state of said first relay switching said back-up lamps from the back-up lamp circuit to said flasher circuit, actuation of said horn circuit causing said back-up lamps to switch on and off in synchronism with the switching of said flasher circuit, a third relay, said flasher circuit, said third relay and the high beams of said head lamps connected in series to said on-state of said first relay, actuation of said third relay by the on-state of said first relay causing the high beams of said head lamps to be switched from the high beam circuit to said flasher circuit, actuation of said horn circuit causing said high beam head lamps to switch on and off in synchronism with the switching of said flasher circuit, said back-up lamps and said high beams of said head lamps being the only lights connected to said flasher circuit, a timer responsive to the on-state of said first relay to switch said first relay into said off-state at a predetermined time period after the horn circuit is actuated.

6. The motor vehicle warning system of claim 5 further comprising:

a fourth relay, the parking lamps and said fourth relay being connected in series to said on-state of said first relay, actuation of said horn circuit causing the parking lamps, if off, to be turned on.

7. The warning system of claim 5 further comprising:

a manual enable/disable switch between said first relay and the horn circuit to permit operator disconnection of said warning system.

8. The warning system of claim 6 further comprising:

a manual enable/disable switch between said first relay and the horn circuit to permit operator disconnection of said warning system.

* * * * *